US 8,204,491 B2

(12) United States Patent
Richardson

(10) Patent No.: US 8,204,491 B2
(45) Date of Patent: Jun. 19, 2012

(54) METHOD AND DEVICE FOR RESTRICTED ACCESS CONTACT INFORMATION DATUM

(75) Inventor: Roger D. Richardson, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 307 days.

(21) Appl. No.: 12/621,938

(22) Filed: Nov. 19, 2009

(65) Prior Publication Data

US 2010/0069055 A1    Mar. 18, 2010

Related U.S. Application Data

(62) Division of application No. 11/399,800, filed on Apr. 7, 2006, now Pat. No. 7,643,820.

(51) Int. Cl.
*H04M 3/00* (2006.01)

(52) U.S. Cl. ............ 455/418; 455/414.1; 455/550; 709/225

(58) Field of Classification Search .......... 455/412.1, 455/414.1, 418, 550.1; 709/224, 225, 228
See application file for complete search history.

(56) References Cited

U.S. PATENT DOCUMENTS

| | | | |
|---|---|---|---|
| 6,157,829 A | 12/2000 | Grube et al. | |
| 6,205,420 B1 | 3/2001 | Takagi et al. | |
| 6,226,502 B1 | 5/2001 | Chung | |
| 6,266,525 B1 * | 7/2001 | Peterson | 455/410 |
| 6,360,198 B1 | 3/2002 | Imai et al. | |
| 6,594,630 B1 | 7/2003 | Zlokarnik et al. | |
| 7,009,693 B2 | 3/2006 | Takashina et al. | |
| 7,295,863 B2 * | 11/2007 | Takenaka | 455/567 |
| 7,313,617 B2 * | 12/2007 | Malik et al. | 709/225 |
| 7,620,705 B2 * | 11/2009 | Hodgson et al. | 709/220 |
| 2001/0044316 A1 * | 11/2001 | Takahashi | 455/550 |
| 2002/0128825 A1 | 9/2002 | Sugino | |
| 2004/0102225 A1 * | 5/2004 | Furuta et al. | 455/566 |
| 2004/0186723 A1 | 9/2004 | Mizutani et al. | |

* cited by examiner

*Primary Examiner* — Nhan Le
(74) *Attorney, Agent, or Firm* — Paula N. Chavez; Sylvia Chen

(57) ABSTRACT

A method in a mobile communication device and a network for transmitting, receiving, and processing a user-accessible contact information data entry in a contact information storage medium (214). User-accessible contact information data, such as a telephone book entry, is transmitted by a sender's device to the mobile communication device (202) with particular restrictions on the entry that trigger a processor (212) to carry out instructions (226, 224, 222) to restrict annunciation, transmission, and/or modification of the telephone book entry and also to trigger instructions (218) to delete all or part of the telephone book entry upon fulfillment of an expiration criterion specified by the sender's device.

7 Claims, 4 Drawing Sheets

METHOD AND DEVICE FOR RESTRICTED ACCESS CONTACT INFORMATION DATUM

FIELD

Disclosed are an electronic device and method of an electronic device and a method of a network for transmitting, receiving, and processing a contact information storage medium entry in a directory of a mobile communication device, and more particularly, for providing restricted access thereto.

BACKGROUND

The memory of a mobile communication device may include different directories with files that are accessible for viewing and modification by the user. For example, directories for a telephone book, a calendar, and email may include viewable and modifiable files. An entry to a directory may be made by the user or sent to the directory by an entity other than the user of the mobile communication device.

Push technology may be utilized by another entity for sending an entry to the directory of a mobile communication device. The receiving mobile communication device can therefore be configured to receive files sent by an entity other than the user via push technology. The other entity may transmit the files, for example, via the mobile device's service provider using short messaging services or other digital data-transfer services.

Typically, the user can have full access to the entries provided by the other entity. That is, the user may fully view and may modify those entries. For example, the user may wish to change the identification or name of the entry and so may modify the name element of the file. On the other hand, the user may wish to copy or move the entry or a portion of the entry such as an attachment to another directory, or the back up the entry to another device. In another example, the user may wish to delete all or a part of the entry.

Standard types of files may be sent via push technology. For example, push technology can transmit entries to particular directories of a mobile communication device such as an email directory. However, in such situations, the entity-provided email entry is under the control of the recipient mobile communication device user. In a different set of circumstances, it may be desirable that the sender control access to the entry. That is, the sender may wish to limit the ability of the mobile communication device user to view the contents, modify, delete, or re-transmit the contents.

In a casual, business, or social situation, a person or entity may wish to send a contact information file to a directory such as the telephone directory of a user's mobile communication device. However, it may be desirable to restrict all or part of the contact information in some manner. For example, it may be desirable to block certain portions of the contact information. Additionally or alternatively, it may be desirable that all or part of the contact information expire. Therefore, it may be beneficial that the person or entity is able to transmit a file to a directory of the user's mobile communication device but control the user's access to, modification of, and/or re-transmission of the data of that file.

DETAILED DESCRIPTION

Figure 1:
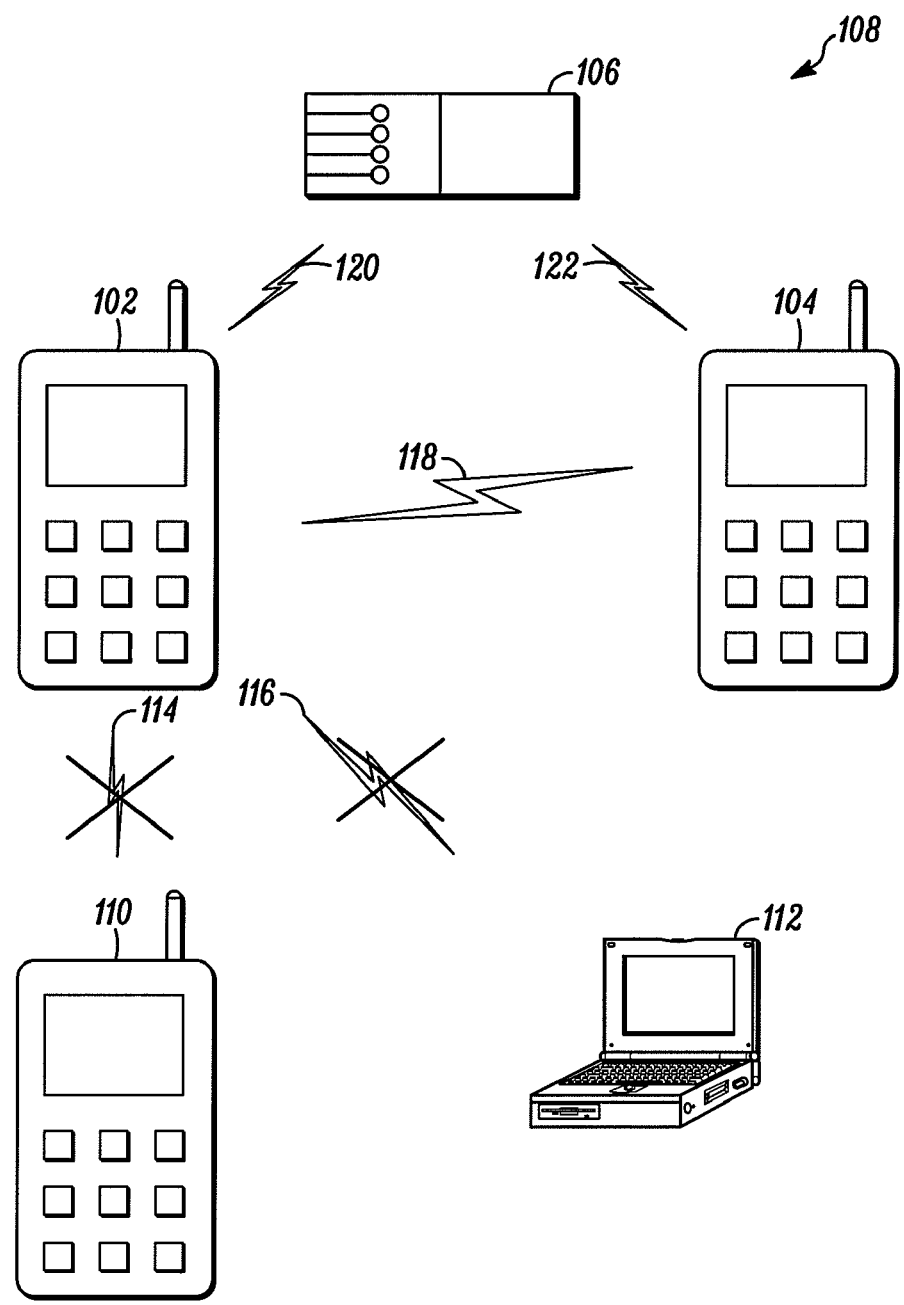
FIG. 1 depicts a network including a mobile communication device, a sender's device, and a server in accordance with an embodiment.

Disclosed are an electronic device and method of an electronic device and a method of a network for transmitting, receiving, and processing a contact information storage medium entry, such as a telephone book entry, in a directory of a mobile communication device. The telephone book entry is transmitted by a sender device to the mobile communication device with particular restrictions on the entry. In this manner, a sender device can transmit a file to a directory of a user's mobile communication device and maintain control of the user's access to, modification of, and/or re-transmission of the data of the file. The received file may include a user-accessible contact information datum so that the user, for example, may use the contact information datum to place a call to the telephone number in the contact information datum. As described in detail below, there may be restrictions placed on the contact information datum that can prevent annunciation, modification, and/or re-transmission of the datum. Also, the contact information datum may be configured to expire when a predetermined expiration criterion is met.

A mobile electronic device can include one or more memory components for storing contact information or contact datum. The mobile electronic device can be configured to accept the transfer of the contact datum file. At least a portion the contact datum file, stored for example in the telephone book of the communication device, may include an annunciation restriction and/or modification restriction. The file may also include a time duration restriction such as an expiration criterion. The file may further include a transmission restriction. Other types of restrictions on the contact datum are within the scope of this discussion.

More than one type of restriction can be part of the entry. A time duration restriction, for example, may include a period of time within which contact may be made. A limited access restriction, for example, may include a number of times a contact may be made. In this manner, a temporary phone book entry may allow a person to contact a recently-met acquaintance once during one month. If the acquaintance wants to continue the relationship, the acquaintance can alter the permissions on the phone book entry either remotely or directly.

The contact datum file of the entry may include more than one telephone number. For example, the user can be sent the contact information for a meeting including telephone numbers of all of the attendees. The contact information can be set to expire after a certain time duration, such as two weeks after the meeting. If contact is not made with any of the attendees during the two weeks after the meeting, all or some of the phone numbers could be automatically deleted.

Contact information can be exchanged between two parties, either simultaneously, and/or based on conditions. As an example, contact information can be exchanged between two singles. If there is an annunciation restriction on the entries, either single has the ability to contact the other, but neither one has the actual phone number within their control. If no contact is made, or unsatisfactory contact is made, the contact datum with the annunciation restriction may be removed from the other phone by a time restriction or by user instigation, effectively ending any undesired contact according to the entry.

Time restrictions can be placed on contact datum that is entered by a transfer from a sender device. Were the user to receive contact datum such as telephone numbers of a particular category, such as entertainment venues in particular visited city, the user may wish the contact datum to expire after, for example, one month by which time the visit would be over. The device thus may be configured to perform an automatic cleanup of the expired contact datum.

FIG. 1 depicts a network 108 including a mobile communication device 102, the sender's device 104 and a server 106. The mobile communication device 102 shown is implemented as a cellular telephone (also called mobile phones). The mobile communication device 102, however, represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, the capability of transferring digital data, SMS messaging, Internet access, multi-media content access, and/or voice over internet protocol (VoIP).

The sender's device 104, while depicted as another mobile communication device may be any type of device that may transmit a file to the mobile communication device 102. For example, a desktop computer may be in communication with a server that can receive communication therefrom and transmit it to the mobile communication device 102.

The server 106 is depicted as a remote server within the wireless communication network 108. The network 108 of course may be any type of wireless network including an ad hoc or wireless personal area network, a WiFi or wireless local area network, and a cellular or wireless wide area network. Likewise, the server 106 may be of any suitable configuration. The server 106 may be implemented as a single server or as a plurality of servers in communication in any arrangement. The operations of the server 106 may be distributed among different servers or devices that may communicate in any manner. It is understood that the depiction in FIG. 1 is for illustrative purposes.

Transmission 118 between device 104 and 102 includes restricted contact datum. Each or either device 102 and 104 can transmit and receive signals, directly 118 or indirectly 120 and 122 through the server 106, that includes restricted contract datum. FIG. 1 further illustrates other devices such as another mobile communication device 110 and a computer 112 in accordance with an embodiment. As will be discussed in more detail below, transmission 114 and 116 of restricted contact datum to other devices may not be permitted.

The entry of contact information datum to a directory of the mobile communication device 102 can include encapsulated data content. That is, the contact information datum either as a whole or as individual items in the entry includes one or more special restriction modifiers. Accordingly, the data may be encrypted. As mentioned, the mobile communication device 102 can be restricted from modifying the record except, possibly, to delete it. The restriction modifiers can include the capability to instigate a self deletion of the record and the subsequent blocking of the use of all or part of the associated message traffic based on the removed restricted entry after the active time for the record expires.

The entry or record that is received and stored in the memory of the mobile communication device 102 may have a global effect on other functions and components of the mobile communication device. Any other application or function of the mobile communication device 102 therefore may be affected by the restrictions of the entry or record. For example, the user of the mobile communication device 102 may be restricted from sending SMS messages to multiple addresses or telephone numbers that contain the restricted telephone number. Another example of the effect of global restrictions is that the data of the entry may not be capable of back up. Yet another example of the global effects may be an alteration of the ring tone of the mobile communication device 102. In yet another embodiment, the global effect of the restrictions of the entry may stop other methods of communication or functions from revealing or allowing further communications with the restricted telephone entry. Conference calling, OUTLOOK functionality, email, caller ID, and any other application available on the mobile communication device 102 are therefore inhibited according to the restrictions of the entry or record.

The combination of restrictions and global effects of an entry or record that is received and stored in the memory of the device 102 may be in any configuration. In one situation, for example, a sender device 104 belongs to a person who is a sales representative at a product convention. The owner of the sender device 104 meets the owner of device 102 at an event such as a cocktail party and invites the owner of device 102 to visit a marketing presentation that will occur the following evening. The marketing presentation is by invitation only. The owner of sender device 104 may therefore wish to transmit an invitation to the owner of device 102 and include restrictions on the contact datum entry and create certain global effects on the functionality of device 102.

When received by device 102, the invitation may be provided along with the RSVP telephone number with a time restriction set to expire just before the marketing presentation. The RSVP telephone number further may only be used to RSVP to the specific event, and therefore may include an annunciation restriction and time restriction. The invitation may be presented by the device 102 to its owner, for example, by a text message and the response may be provided by prompt. Accordingly, a global effect of the received entry may include generating the RSVP response prompt of device 102. The RSVP response prompt may further have an associated expiration time, that is, it may expire just prior to the event. Furthermore, device 102 may be configured by the entry to annunciate the invitation more than one time before the marketing presentation event so that the user may have more than one opportunity to send a positive RSVP.

The contact datum file received by device 102 may further include telephone number(s) of one or more marketing company representatives available to the owner of device 102 after the marketing presentation. One or more restrictions on the contact datum may include a time that the telephone numbers of the one or more marketing company representatives' telephone become available. Accordingly, time restrictions on the entry may include both an expiration time and an availability time.

The contact datum entry received by device 102 and sent by device 104 may further contain marketing links. For example, the contact datum may include a URL link that leads to a website featuring the marketing company's products. The device 102 may be configured by global effects of the contact datum entry to prompt the owner of device 102 to visit the website at a certain time, for example in the event that a positive RSVP has been sent from device 102. Accordingly, the owner of device 102 may be prompted to click a particular link before the presentation. If a positive RSVP was not sent or a negative RSVP was sent, then the contact datum may be configured to provide a different URL link to the owner of device 102, still encouraging the owner of device 102 to maintain an interest in the marketing company's products.

There may be time restrictions on modification restrictions of the entry. For example, the entry received by device 102 may be configured so that the owner of device 102 may not modify the entry or delete the entry for a certain time, for example, forty-eight hours after the entry is received so that the marketing company may continue its program to market its products. At the expiration of that time, the owner of device 102 may modify or delete all or part of the entry.

Accordingly, if devices 102 and 104 are configured to send and receive entries, either one way, or two ways, any number of combinations of restrictions and global effects may be exchanged. While the above discussion includes restrictions including a time duration restriction, a limited access restriction, a modification restriction, and a transmission restriction, any other restrictions are within the scope of this discussion. Furthermore, while the global effects discussion above has included adding prompts to a user's device, reminder messages, and initiating Internet communications, other global effects are within the scope of this discussion.

Figure 2:
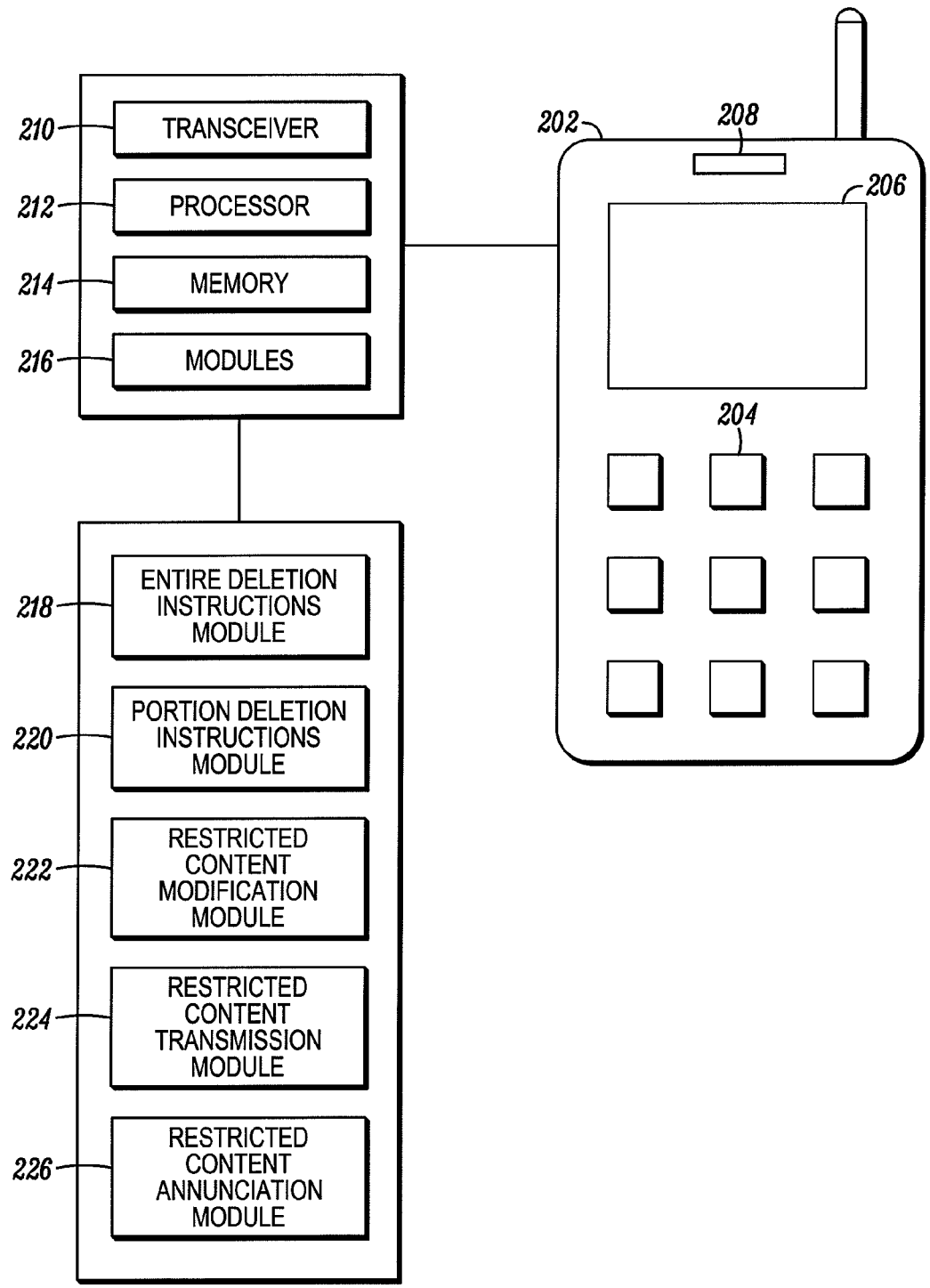
FIG. 2 depicts a mobile communication device, such as the device shown in FIG. 1, including some of its components in accordance with an embodiment.

FIG. 2 depicts a mobile communication device 202, such as device 102 shown in FIG. 1, including some of its components in accordance with an embodiment. The mobile communication device includes input capability 204 and annunciation capability such as a display 206 and a speaker 208. For communication with one or more networks, such as those specific for a cellular network and a WLAN, the mobile station includes at least a first transceiver 210. The mobile station further includes a processor 212 and a memory 214 and one or more modules 216, which can be implemented in software, such as in the form of one or more sets of prestored instructions, and/or hardware, which facilitate the operation of the mobile station or electronic device as discussed below.

Also shown in FIG. 2 are certain modules that can carry out certain processes of the methods as described. They include an entire deletion instructions module 218, a portion deletion instructions module 220, a restricted content modification module 222, a restricted content transmission module 224, and a restricted content annunciation module 226. The functions of these modules and other functions will be discussed in more detail below.

An entity such as another user that can communicate with the sender's mobile communication device (see 104, FIG. 1) creates or constructs a directory entry having contact information datum to be transmitted to the mobile communication device 202 (see 102, FIG. 1) which is configured to accept the entry. The entry is received by the mobile communication device 202 via its transceiver 210 and processed by its controller or processor 212. The mobile communication device 202 stores the entry in its memory 214, and at least one portion of the entry is subject to an expiration criterion. Additionally, at least one portion of the entry is subject to a restriction.

Figure 3:
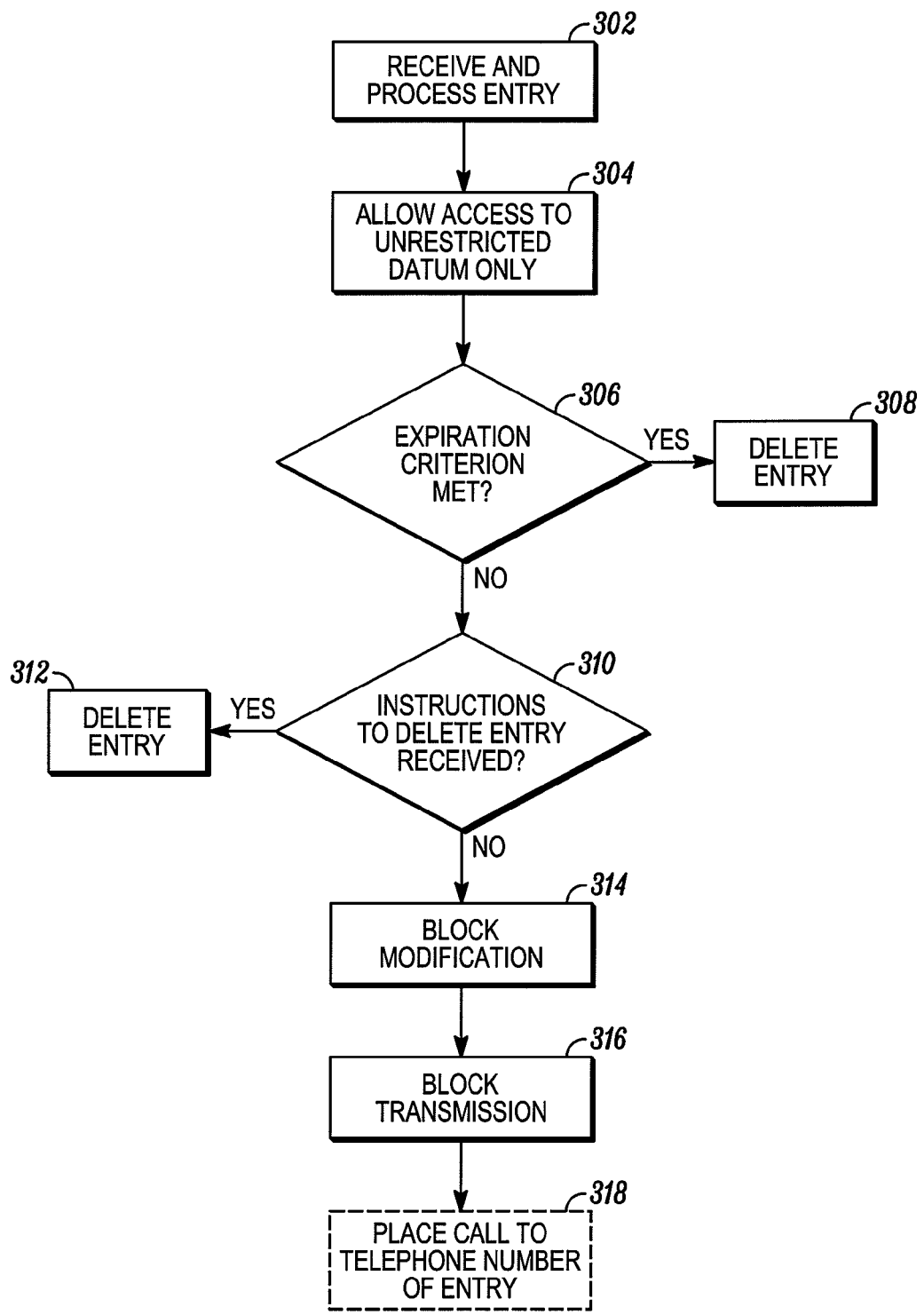
FIG. 3 is a flow chart of an embodiment of a process of a communication device such as that shown in FIG. 2.

FIG. 3 is a flow chart of an embodiment of a process of a communication device 202 such as that shown in FIG. 2. The steps of the process shown are mostly to be taken in any order. The device receives and processes the telephone book or other type of entry to a directory in its memory 302. Instructions for restricting annunciation of a portion or all of the entry may be received with the entry. Instructions for deleting a portion or all of the entry may be received with the entry. Also, instructions for restricting modification and transmission of a portion or all of the entry may be received with the entry.

The user of a mobile communication device 202 such as that of FIG. 2, may wish to view or otherwise access the contact information datum that has been received. If there is unrestricted datum, the flow allows the user to access to unrestricted datum 304. As mentioned above, annunciation of a portion or all of the contact information datum may be restricted in some manner. That is, certain parts of the file may be restricted from annunciation on the display screen or speaker of the device. For example, the telephone number of the contact information datum may be restricted from viewing. Alternatively, only a portion of the telephone number may be annunciated, such as the area code and/or country code number. In this manner, when a user places a call using the contact information datum received by the mobile communication device, the user may know whether the call is a local call or a toll call without knowing the entire telephone number. There may be long distance charges associated with the call that the user may wish to avoid. It is understood that any type of restriction upon annunciation is within the scope of this discussion.

The annunciation restriction may be applied to the speaker of the mobile communication device. For example, the dial tones or dual tone multi-frequencies (DTMFs) typically audibly generated may be muted when a call is placed to the number per the contact information datum. In this manner, the telephone number being dialed may not be revealed.

Other information may be annunciated in the received entry at the discretion and direction of the sender. For example the information contact datum may contain unrestricted contact data such as the name of the sender or a photograph or video of the sender. On the other hand, the sender may choose to instruct the mobile communication device to annunciate that information only after a certain criterion has been met. For example, the criterion may provide access after a time period has expired or a call has been placed to the telephone number of the contact information datum.

In general, an outgoing call list of a mobile communication device includes the telephone numbers of all calls made by the device. Such an outgoing call list is often available on a mobile communication device in a "recently-dialed calls" menu. However, according to an embodiment, the entry furthermore contains a restriction from listing the call in the outgoing call list. Alternatively a restriction may include instructions to make reference to the outgoing call by only a part of the telephone number or some other indicator, such as the name of the contact. It is understood that any type of restriction made to the entry, in particular, to maintain the anonymous features of the contact information datum is within the scope of this discussion.

As mentioned above, instructions for deleting a portion or all of the entry may be received with the entry. Accordingly, entire deletion instructions module 218 and/or portion deletion instructions module 220 may be installed into the memory device 202 by the entry (see FIG. 2). The entry received by the mobile communication device can include instructions to delete all or part of the user-accessible contact datum from the contact information storage medium when the expiration criterion has been met 306. The expiration criterion may include that a predetermined period of time has elapsed. The expiration criterion may also include an event such as a call being placed to the telephone number of the contact information datum. It is understood that any type of expiration criterion is within the scope of this discussion.

After the expiration criterion is met, the entry is deleted 308. Instructions for providing a prompt by the annunciation device in conjunction with the expiration criterion may also be included with the transmitted file or subsequent to transmission of the file. That is, the sender of the entry may include instructions that the expiration criterion include a prompt to the user of the mobile communication device for approval to delete all or a portion of the entry. In this manner, it may be optional for the user to delete the entry manually versus having the entry be deleted automatically.

The sender of the entry may prefer to delete all or a portion of the entry prior to the set expiration according to the expiration criterion. In such a case, the sender may send an instruction to delete all or a portion of the entry 310 so that the deletion takes place before the expiration criterion is met 312.

Instructions for restricting modification of a portion or all of the entry may be received with the entry. Accordingly, restricted content modification module 222 may be installed into the memory device 202 by the entry (see FIG. 2) to block modification 314 by the user per the received instructions. The user may attempt to make modifications to the entry via the input device of the mobile communication device, or by another manner while the sender may wish to block modifications of the entry, in particular, that would reveal otherwise restricted contact information datum. Also, the sender may wish to block modifications that change the expiration criterion. It is understood that any type of modifications to the entry may be blocked in accordance with this discussion.

Instructions for restricting transmission to a different device of all or part of the entry may also be received with the entry. Accordingly, restricted content transmission module 224 may be installed into the memory of device 202 by the entry (see FIG. 2) to block transmission 316 by the user per the received instructions. In the event the transmission could reveal some or all of the restricted contact information datum, such transmission may be restricted as well. Again referring to FIG. 1, crossed-out transmission icons 114 and 116 are to illustrate that there can be restrictions on transmission of all or part of the entry.

In a different situation, it may be desirable to transmit restricted contact information datum. For example, to maintain anonymity of the datum, the service provider may need to know not to reproduce restricted data, for example, on a monthly bill. In the event that a telephone call is placed in accordance with the restricted contact information datum, the service provider of the mobile communication device may become apprised of the called telephone number since in general, cellular and wireline telephone service providers maintain a call list. The call list may normally include the telephone numbers of outgoing calls. Accordingly, transmission of the restriction or restricted data with instructions to limit annunciation, for example, in a telephone bill may be sent to the service provider. Such a transmission may be made by the mobile communication device itself or by the device of the sender or in another manner.

A telephone call from the mobile communication device may be placed in accordance with the user-accessible contact datum of the entry 318 regardless of whether it can be annunciated or modified or transmitted. As discussed above, the telephone number called may be restricted from the display as the telephone number is dialed by the mobile communication device. The DTMF tones may be muted from the speaker as the telephone call is placed. The telephone number may be restricted either entirely or in part on the outgoing call list. The telephone number may further be restricted on the telephone bill or other data or documents of the service provider. It is understood that any manner in which to restrict the annunciation of the telephone number from the entry or as a result of a telephone call placed to the telephone number is within the scope of this discussion.

Figure 4:
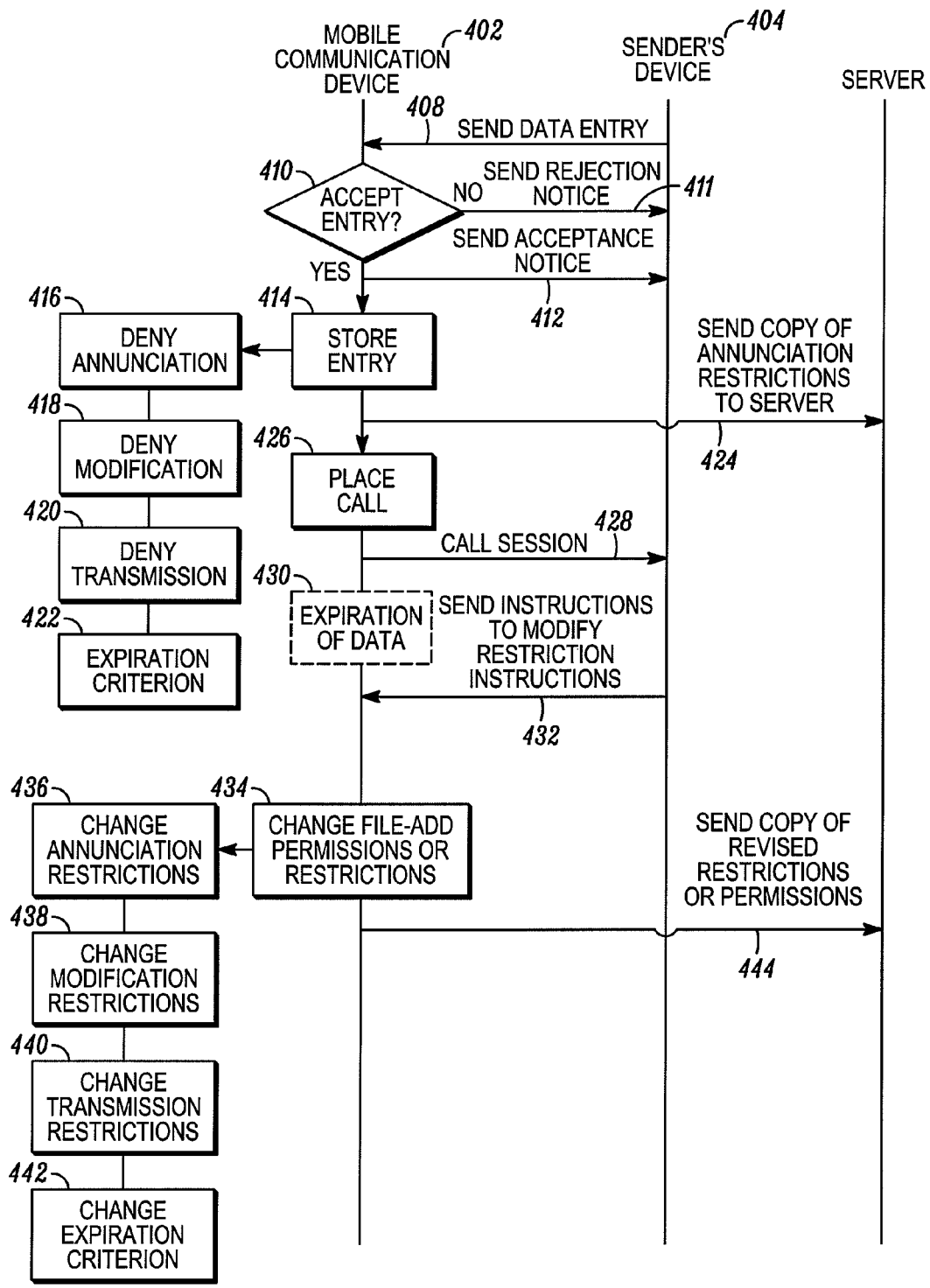
FIG. 4 is a signal flow diagram showing a signal flow between a mobile communication device, a sender's device, and a service provider.

FIG. 4 is a signal flow diagram showing the signal flow between the mobile communication device 402, the sender's device 404, and the server 406. It is understood that the steps of the process shown are mostly to be taken in any order. As mentioned above, the mobile communication device 402 includes at least one transceiver, and the sender's device 404 includes a transceiver capable of communication with the mobile communication device 402 either directly or indirectly. The sender's device 404 is capable of transmitting to the mobile communication device 402 user-accessible contact datum that is subject to restriction 408, particular types of which are described above. It is understood that the transmission 408 from sender 404 to the mobile communication device 402 can be made in any manner, including device-to-device by for example a protocol such as Bluetooth, or a transmission involving a network or service provider. Other implementations for delivery 408 may include email, SMS, MMS, or WLAN. In addition, in another embodiment, a service (by which the sender of the entry may be screened) may forward the restricted entry to the mobile communication device 102.

The mobile communication device 402 is configured to accept the entry into one or more of its directories 410 or deny the entry. In one embodiment, the entry may include a plurality of contact information datum, such as telephone numbers and email addresses, some of which may be without restriction. Some or all of the contact information datum may be subject to modification restriction as well. In another embodiment, the mobile communication device may be configured to accept a plurality of entries to the same or different directories substantially simultaneously, or in sequence.

If the device 402 is not configured to accept the entry, it sends a rejection notice 411 to the sender's device 404. The device 402 may be configured to accept entries that conform to the preferences set in the device 402. If the transmitted entry does not conform to the preferences set in the device 402, the device may send a qualified rejection message to the sender. The sender may automatically or manually conform to the preferences of the device 402 and attempt another transmission. In the event that the mobile communication device 402 is capable of receiving the entry, it may accept the entry and send an acceptance notice 412 to the sender. The acceptance message may include some restrictions of its own. For example, it may in the reverse, send commands to delete the telephone number of the mobile communication device 402 upon certain expiration criterion being met in the sender's device 404.

Once the data has been accepted 410, the device 402 stores the contact information datum 414. As described in detail above, the entry may include restrictions placed on the contact information datum that can prevent or deny annunciation 416, modification 418 and transmission 420 of all or part of the datum and also instructions for expiration when a predetermined expiration criterion is met 422. It is understood that the terms block, deny, prevent, suppress, and restrict may be used interchangeably depending upon the context.

During or after the storage of the entry 414, the mobile communication device 402 and/or the sender's device 404 may transmit at least a portion of the user-accessible contact datum that is subject to restriction to the server 406 or other associated network entity so that the service provider can suppress in a communication record at least a portion of the user-accessible contact datum that is subject to restriction 424. In this manner, outgoing telephone records such as bills can be restricted according to the annunciation restriction.

The mobile communication device 402 may place a call based on the user-accessible contact datum 426 as described above, and a call session therefore may be requested 428. In the event that the expiration criterion is that the call is placed, all or a portion of the entry may be deleted 430 from the memory of the mobile communication device 402 when the call is placed. Expiration criterion, as mentioned above, may be time based or may be event based. Once a call is placed, the service provider can be apprised of the call for billing, tracking, or other purposes. As mentioned above, the service provider previously may be apprised that there are restrictions on the annunciation of certain contact information datum. After deletion of all or part of the contact information datum from the mobile communication device memory, the use of any remaining contact information is still subject to the restrictions of the device 402 and the network 406 level data restrictions may stay in place. Note that the expiration 430 can be replaced by the reception of instructions to delete the entry 310 as described with reference to FIG. 3.

Prior to expiration 430 at any particular point in the process, or afterward if a backup file remains on the device 402, the sender's device 404 may send instructions 432 to the mobile communication device 402 to modify or overwrite restrictions for the data entry. A transmission including instructions to overwrite or modify the entry may occur at any time in the process. Any type of overwrite or modification of the entry is within the scope of this discussion. The device 402 may accept the change to the file, which may add permissions or restrictions 434 to the entry. For example, instructions to change the annunciation restrictions 436, the modification restrictions 438, the transmission restrictions 440, and/or the expiration criterion 442 can be provided. A changed restriction or added permission may be transmitted 444 to the network 406.

As discussed above, in a casual, business, or social situation, a person or entity may wish to send a contact information file or a contact datum entry to a directory such as the telephone directory of a particular user's mobile communication device. In a social situation, for example, it may be desirable that all or part of the contact information of the entry is restricted in some manner. Information can be exchanged between two people but for various reasons, one or both may wish that that certain portions of the contact information be blocked or set to expire. Either party may have the ability to contact the other but neither one may have access to the actual phone number of the other because there may be an annunciation restriction on the entry. Additionally or alternatively, it may be desirable that all or part of the contact information expire. If no contact is made or unsatisfactory contact is made, the contact datum entry with the annunciation restriction may be removed from the user's mobile communication device by a time restriction or the sender's instigation, effectively ending the undesired contact in accordance with the entry. The above-described technology provides the ability to transmit a contact datum file to a directory of another user's mobile communication device but with restrictions including restricted access to, modification of, and/or re-transmission of the data of an entry. In this manner, communication may be pursued between parties that may otherwise hesitate to exchange personal information.

This disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method for processing a telephone book entry in a mobile communication device having at least one transceiver, the method comprising:
   receiving, via the transceiver, information for the telephone book entry including an expiration criterion, wherein the information for the telephone book entry includes at least one telephone number;
   storing the information for the telephone book entry in a memory;
   suppressing an annunciation of at least a portion of the telephone number; and
   deleting the information of the telephone book entry when the expiration criterion is met.

2. The method as recited in claim 1, wherein the telephone number includes an area code, the method further comprising:
   annunciating the area code of the telephone number.

3. The method as recited in claim 1, wherein the information for the telephone book entry includes identification data, the method further comprising:
   annunciating at least a portion of the identification data.

4. The method as recited in claim 1 wherein the expiration criterion is that the mobile communication device places a call to the telephone number of the telephone book entry, the method further comprising:
   deleting the telephone number from the telephone book entry when the call to the telephone number has been placed.

5. The method as recited in claim 1, further comprising:
   disabling modification of the telephone book entry by a user of the mobile communication device.

6. The method as recited in claim 1, further comprising:
   receiving an instruction, via the transceiver, to delete the information for the telephone book entry.

7. The method as recited in claim 1, wherein the mobile communication device is capable of annunciating an outgoing call list, the method further comprising:
   disabling the annunciation of at least a portion of the telephone number from the outgoing call list.

\* \* \* \* \*